US009511826B2

(12) United States Patent
Nutz

(10) Patent No.: US 9,511,826 B2
(45) Date of Patent: Dec. 6, 2016

(54) KAYAK HAVING RECONFIGURABLE CENTER STAGING

(71) Applicant: Confluence Outdoor, LLC, Greenville, SC (US)

(72) Inventor: Hans Eric Nutz, Easley, SC (US)

(73) Assignee: Confluence Outdoor, LLC, Greenville, SC (US)

( * ) Notice: Subject to any disclaimer, the term of this patent is extended or adjusted under 35 U.S.C. 154(b) by 0 days.

(21) Appl. No.: 14/689,839

(22) Filed: Apr. 17, 2015

(65) Prior Publication Data

US 2016/0304166 A1    Oct. 20, 2016

(51) Int. Cl.
*B63B 25/00* (2006.01)
*B63B 35/00* (2006.01)
*B63B 35/71* (2006.01)
*A01K 97/10* (2006.01)

(52) U.S. Cl.
CPC ............. *B63B 25/004* (2013.01); *A01K 97/10* (2013.01); *B63B 35/71* (2013.01); *B63B 2035/715* (2013.01)

(58) Field of Classification Search
CPC ......... B63C 7/003; B63B 7/00; B63B 17/00; B63B 35/00
USPC ........................ 114/201 R, 345, 347; 441/40
See application file for complete search history.

(56) References Cited

U.S. PATENT DOCUMENTS

| | | | |
|---|---|---|---|
| 5,092,263 A | 3/1992 | Hutchison et al. | |
| 5,542,589 A * | 8/1996 | McKee | B60N 3/001 224/275 |
| 5,964,177 A * | 10/1999 | Niemier | B63B 1/042 114/347 |
| 6,178,912 B1 * | 1/2001 | Niemier | B63B 35/34 114/347 |
| 6,401,648 B1 * | 6/2002 | Abbenhouse | B63B 19/14 114/347 |
| 6,435,126 B1 | 8/2002 | Burke | |
| 6,581,538 B2 * | 6/2003 | Sorensen | B63B 35/71 114/347 |
| 7,121,225 B1 * | 10/2006 | Caples | B63B 19/14 114/347 |
| 2002/0166493 A1 | 11/2002 | Sorensen | |
| 2008/0035047 A1 | 2/2008 | McDonough | |

FOREIGN PATENT DOCUMENTS

AU    2009100192    4/2009

OTHER PUBLICATIONS

Ocean Kayak, Modular Fishing Pod (Mod Pod) Hatch and Modular Fishing Pod II (Mod Pod II) Hatch, http://www.oceankayak.com/innovation/key_brand_features/hatches/ (last visited Jul. 13, 2015), known at least as early as Apr. 16, 2015, 3 pgs.
New Zealand Office Action for App. No. 718568, dated Jun. 13, 2016, 9 pgs.
Wilderness Systems ATAK Boat Review video, Kayak Angler Magazine, https://www.youtube.com/watch?v=Ztp6veGXCa0, published Mar. 27, 2015, at 1:25/2:47.
Ocean Kayak Modular Fishing Pod Hatch Kit video, https://www.youtube.com/watch?v=vo_HH6nrx2s, published on Sep. 21, 2010, at 1:41/3:07.
European Search Report for EP App. No. 16165533, dated Oct. 14, 2016, 8 pgs.

* cited by examiner

*Primary Examiner* — Lars A Olson
(74) *Attorney, Agent, or Firm* — Womble Carlyle Sandridge & Rice, LLP

(57) ABSTRACT

This disclosure discussed a kayak. The kayak may have a shell having a hull and a cockpit. The kayak may also have a console approximately centrally located within the cockpit along a widthwise direction of the kayak. The console may have a bottom wall separate from the hull and at least one side wall extending upwardly from a periphery of the bottom wall to at least partially define a storage compartment. The console may also have a replaceable cover. The replaceable cover may have a plurality of apertures of varied dimensions for organizing equipment at least partially staged within the storage compartment.

18 Claims, 7 Drawing Sheets

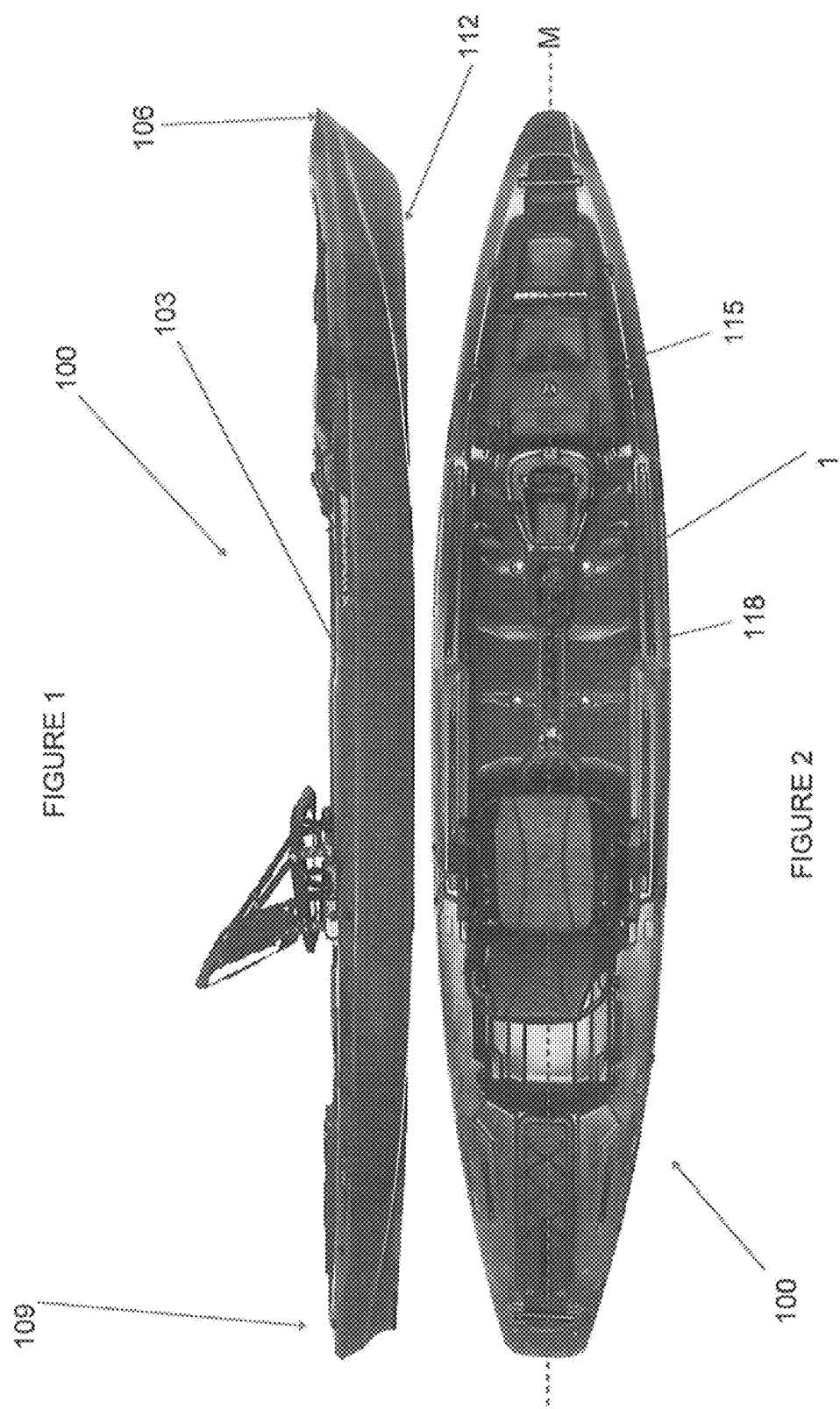

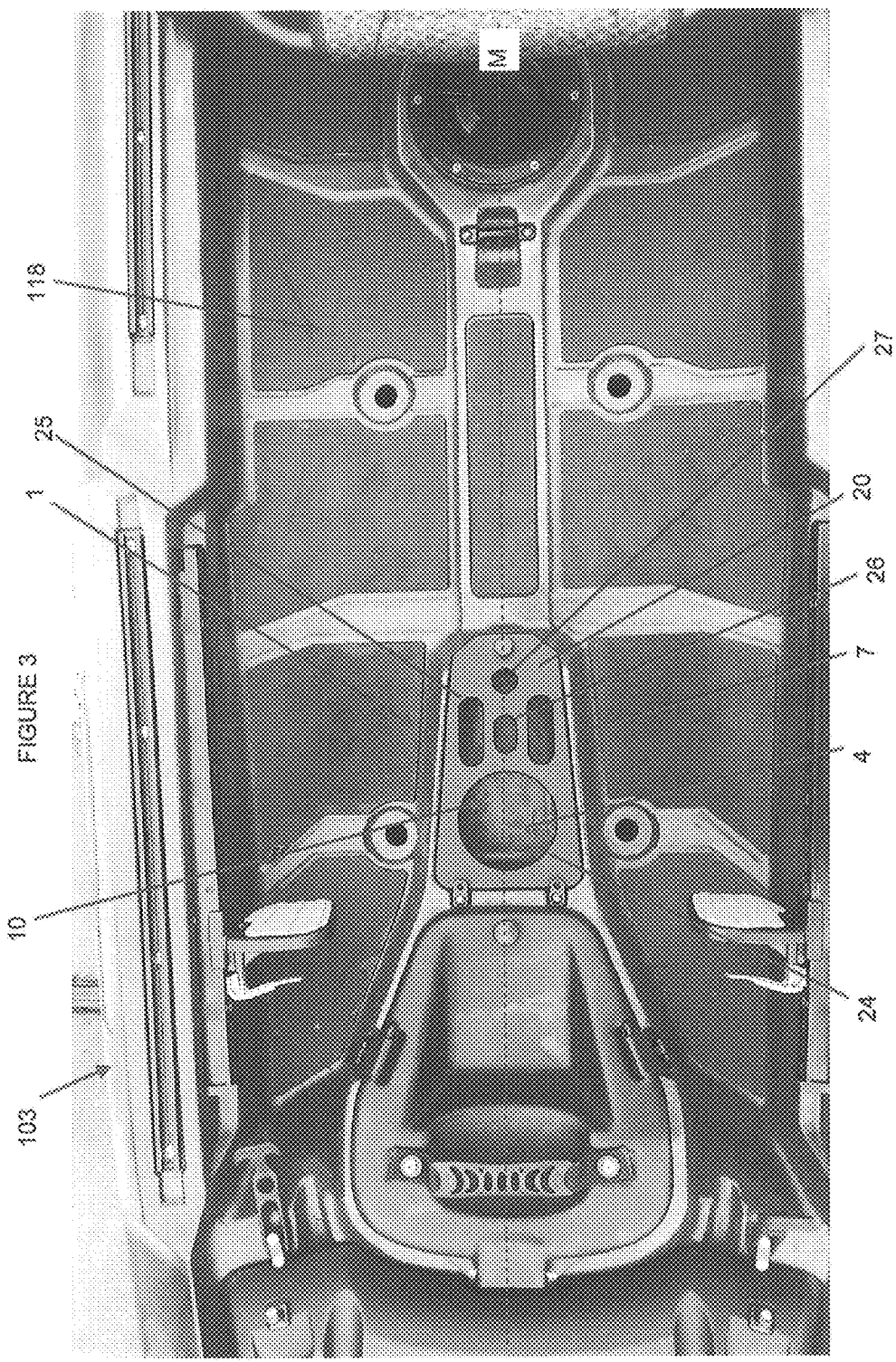

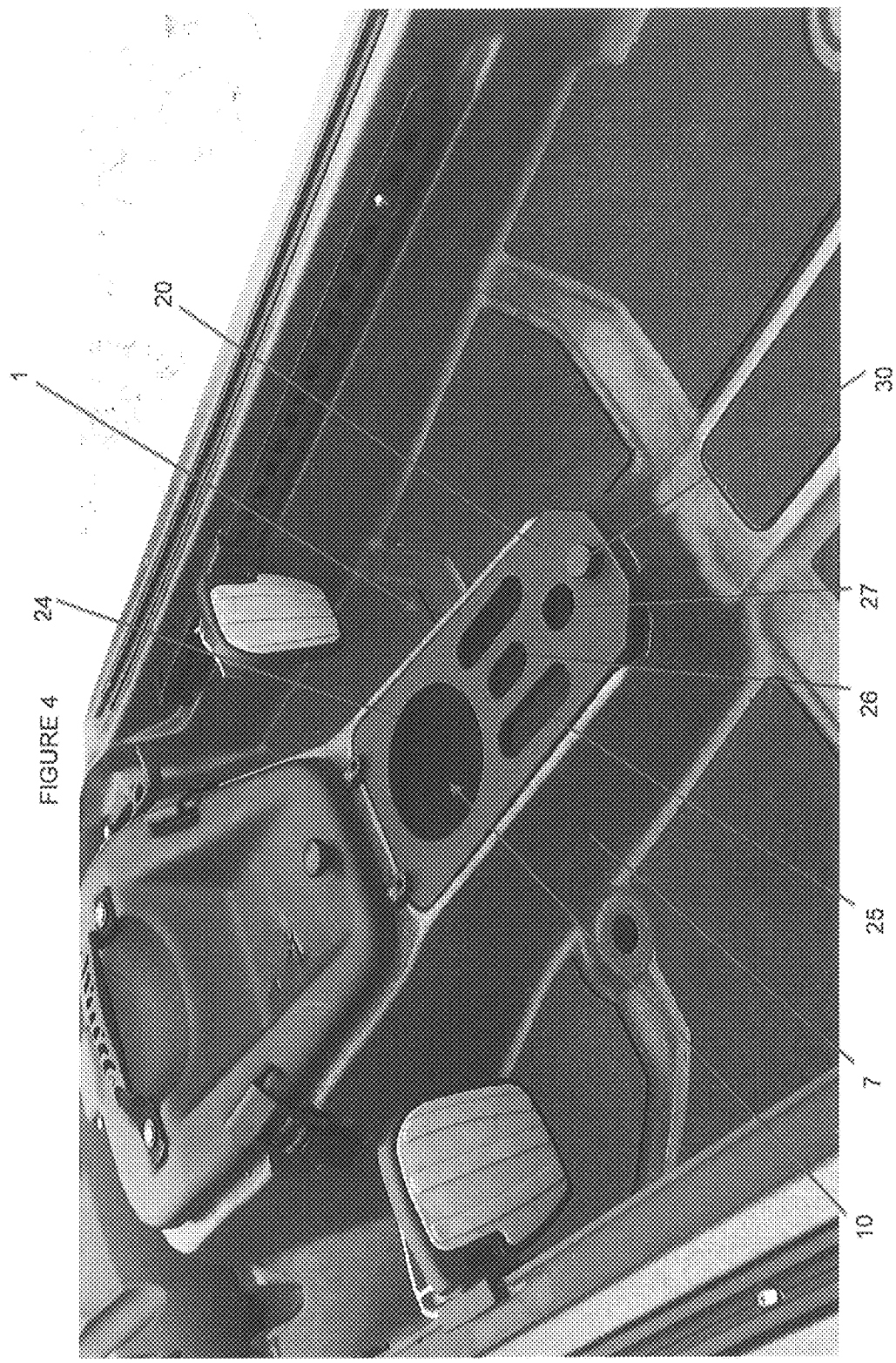

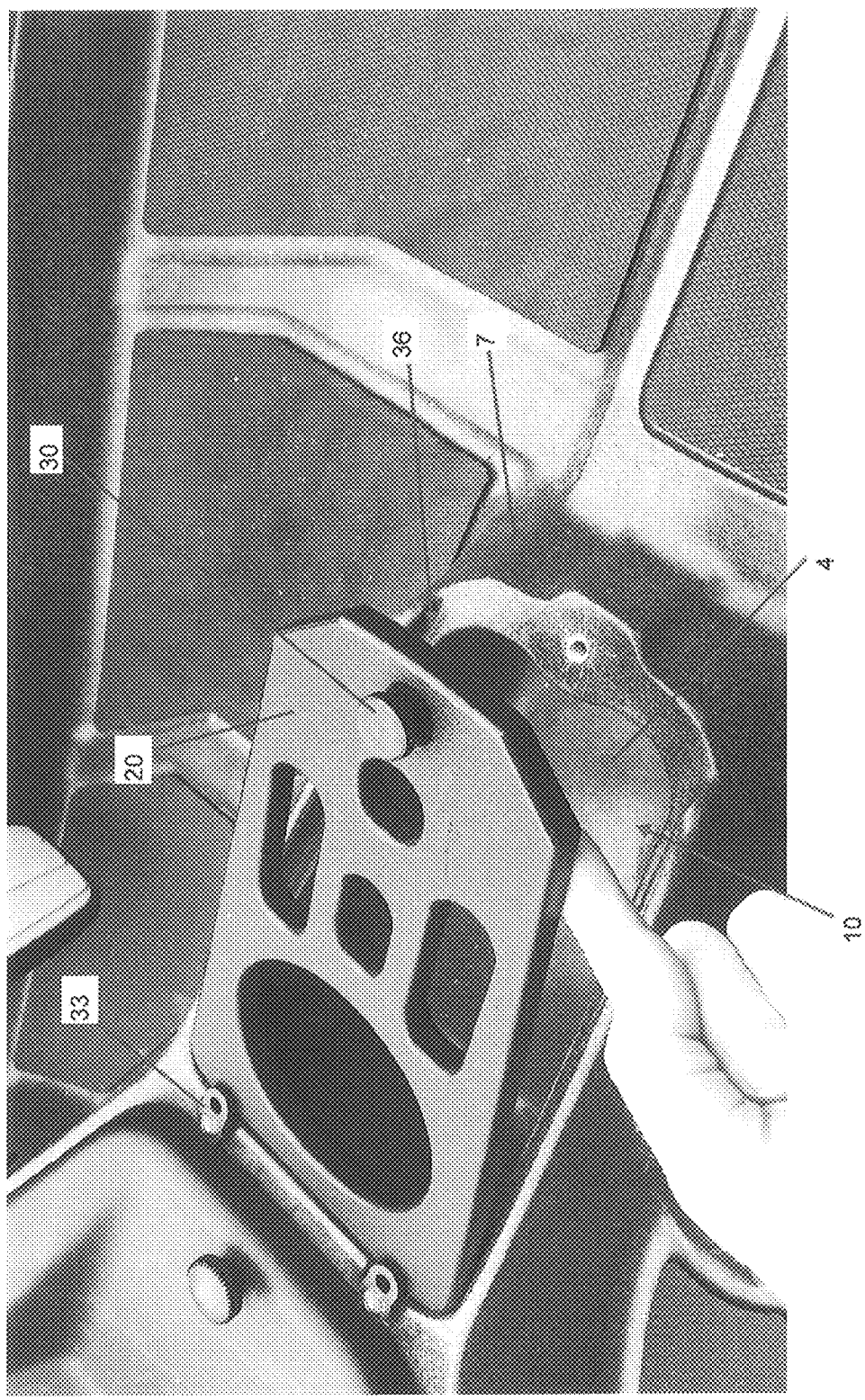

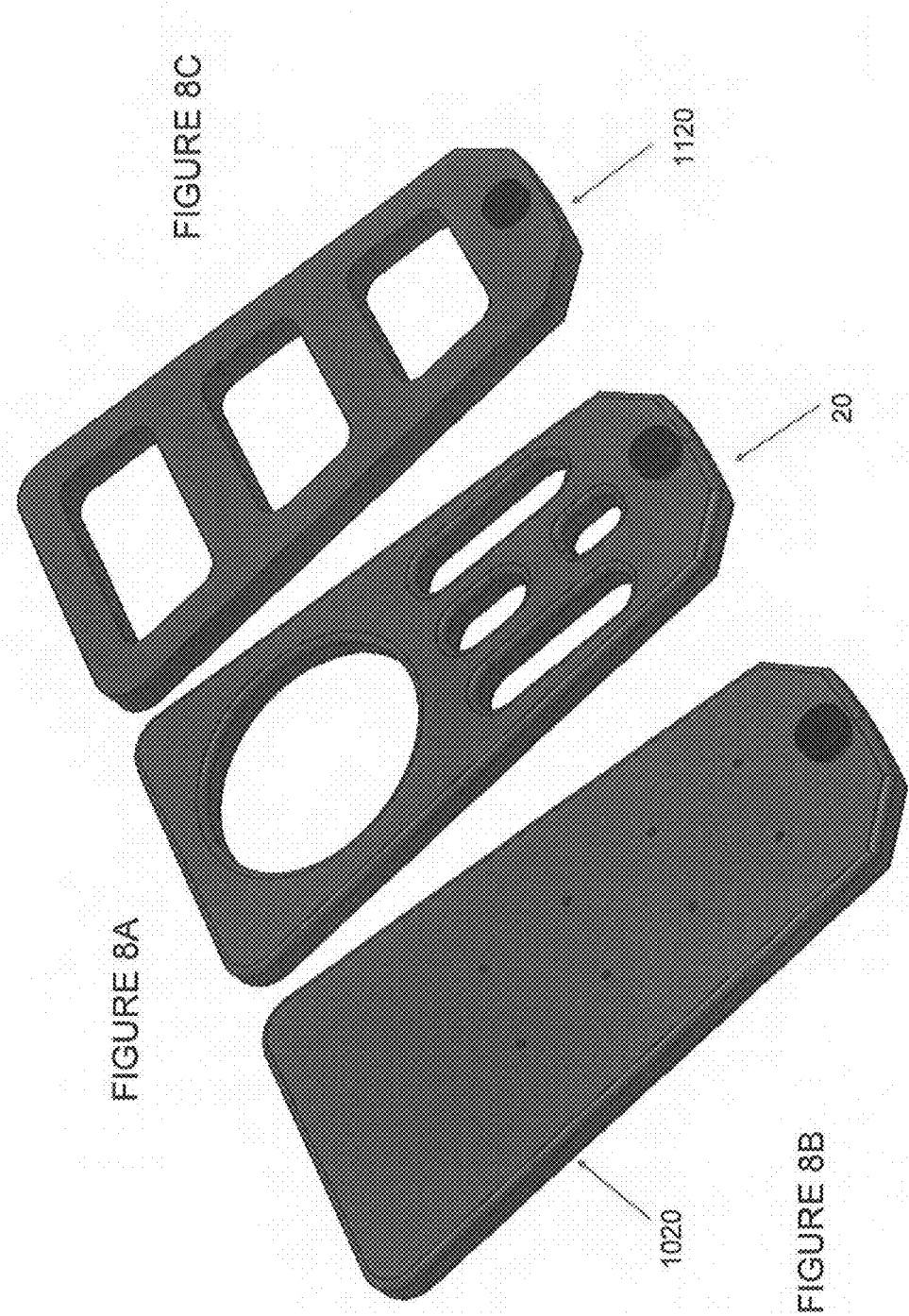

KAYAK HAVING RECONFIGURABLE CENTER STAGING

FIELD OF DISCLOSURE

The present disclosure relates to watercraft, such as kayaks. More particularly this disclosure relates to a staging or storage system for these watercraft.

BACKGROUND

Outdoor enthusiasts realize that proper enjoyment of any activity requires the right tools and accessories. In the category of watercraft fishing, anglers are rediscovering the accessibility, portability, quiet travel, and lower cost of fishing from canoes and kayaks as was common hundreds of years ago. These small boats can travel into shallow water, marshes, and through narrow passages that larger boats cannot. Kayak fishing provides access to bodies of water that may be off limits to motor driven boats. Traveling in a kayak is also quieter above and below the water to avoid alerting the fish below. Anglers who use kayaks also spend less time and effort transporting, launching, pulling and maintaining their boats, to provide more time on the water catching fish.

To meet the demand from anglers, boat designers and manufacturers have developed open cockpit or sit-on-top kayaks designed with unique features to accommodate the rods, lures, tools, tanks, paddles, fish finders and other equipment carried by so many kayak fishermen. As important as the amount of storage space provided on the boat, the arrangement of the storage or staging space is also important. When a fish bites, the angler must jump into action to secure the catch, often resulting in quick movements that may rock the boat. Ineffectively staged grips, pliers, or knives many slide around the cockpit of the boat, becoming lost or traveling out of arm's length from the angler. Worse yet, sudden movement of the fisherman may result in unsecured cargo falling into the water.

Therefore, there is a need for a kayak configured to help the fisherman maintain their necessary items in a secure, organized and easy to reach location so the items can be accessed in a hurry during the rush of motion required for securing the catch. There is also a need for a kayak with customizable storage based on the individual needs of the user.

SUMMARY

Some embodiments of the present disclosure include a kayak. The kayak may have a shell having a hull and a cockpit. The kayak may also have a console located within the cockpit of the kayak. The console may have a bottom wall separate from the hull and at least one side wall extending upwardly from a periphery of the bottom wall to at least partially define a storage compartment. The console may also have a replaceable cover. The replaceable cover may have a plurality of apertures of varied dimensions for organizing equipment at least partially staged within the storage compartment.

Other embodiments of the present disclosure include a kit. The kit may include a kayak having a shell including a hull and a cockpit. The kit may also include a console approximately centrally located within the cockpit along a widthwise direction of the kayak; the console having a bottom wall separate from the hull, and at least one side wall extending upwardly from a periphery of the bottom wall to at least partially define a storage compartment. The console may be integral with the kayak. The kit may also include at least two replaceable covers for the console. The replaceable covers each have a plurality of apertures for organizing equipment at least partially staged within the storage compartment. A first replaceable cover has a first arrangement of the plurality of apertures, and a second replaceable cover has a second arrangement of the plurality of apertures, the second arrangement being different from the first.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

BRIEF DESCRIPTION OF THE DRAWINGS

FIG. 1 is a side view of a kayak according to embodiments of the present disclosure.

FIG. 2 is a top view of a kayak according to embodiments of the present disclosure.

FIG. 3 is a detailed top view of a mid-ship section of the kayak of FIG. 2.

FIG. 4 is a perspective view of a center console of the kayak of FIG. 2.

FIG. 5 shows the center console of FIG. 4 with a cover partially removed.

FIG. 7 shows the center console with optional accessories.

FIGS. 8A-8C show several alternative embodiments of a cover for the center console.

DETAILED DESCRIPTION

Figure 6:
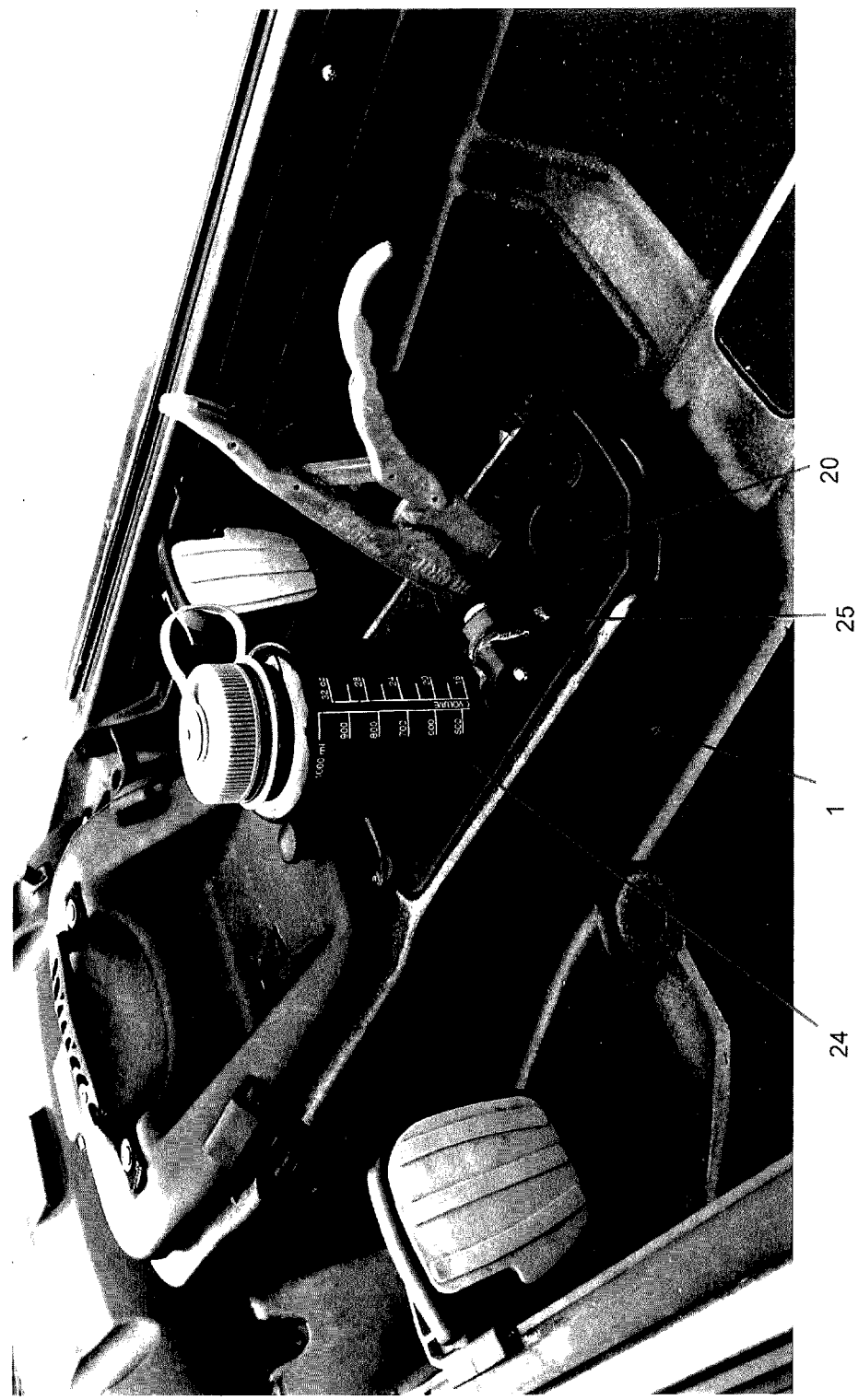
FIG. 6 shows an exemplary view of the center console in use.

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Turning to the figures, FIGS. 1 and 2 show a kayak 100 according to embodiments of the present disclosure. As used herein, the term "kayak" is used generally to describe watercraft or boats that are less than about 16 feet long, less about 4 feet wide and weigh less than about 150 pounds. The "kayak" may be considered a personal watercraft, but is not limited to a single occupant. As used herein, the term "kayak" includes boats generally referred to as canoes, and also includes stand-up paddle boards. The term "kayak" also includes watercraft that may be generally referred to as rowboats. As used herein, "kayaks" are not limited to paddle powered boats, but also include pedal powered boats, or boats with electric motors.

The kayak 100 includes a shell 103 having a bow 106 and a stern 109. The shell 103 is shaped to form a hull 112 along the bottom thereof and a deck 115 along the top thereof. A cavity may be formed between the hull 112 and the deck 115 for buoyancy or for storage. The shell 103 may generally define a cockpit 118. The cockpit 118 is generally understood as the portion of the kayak 100 in which the user is intended to sit or stand. The cockpit 118 is located approximately mid-ship along a bow-stern direction. As best seen in FIG. 2, a console 1 is located within the cockpit 118 and may be itself located approximately mid-ship along a bow-stern direction.

Further features of some embodiments of the console 1 will become more clear in view of FIGS. 3-8. In some embodiments, portions of the console 1 are integrally molded or otherwise formed with the shell 103. In other embodiments, the console 1 may be a separate component attached within the cockpit 118 by fasteners, tie downs, etc.

The console 1 may be referred to as a center console 1 when it is located near the midline M of the kayak 100, for example, approximately centered along a widthwise direction of the kayak 100. The central bow-stern location of the console 1 positions the console 1 generally ahead of the user when seated in the cockpit 12. The central widthwise location of the console may generally position the console between the legs of a seated user. This location is believed to be well within arm's length reach for a user without requiring the user to turn around within the kayak 100. Thus the console 1 is located in a highly accessible location within the kayak 100 for quick and easy access without unnecessary movement of the user, which could cause unnecessary movement of the kayak 100.

The console 1 may have a bottom wall 4. In some embodiments, the bottom wall 4 is separate from and spaced from an inner surface of the hull 112. In those embodiments, the bottom wall 4 is distinct from the hull 112. The bottom wall 4 may or may not include a scupper hole leading through the hull 112.

The console 1 may also include at least one side wall 7 extending upwardly from a periphery of the bottom wall 4 to at least partially define a storage compartment 10. When the bottom wall 4 is separate from the hull 112, the storage compartment 10 should be understood as a distinct space from the optional cavity formed between the hull 112 and the deck 115. Whether a single continuous wall or several separate walls, the at least one side wall 7 forms the periphery of the storage compartment 10. The storage compartment 10, may be understood as an open-top recess when considering the bottom wall 4 and the at least one side wall 7 alone.

The top of the storage compartment 10 may be formed by a replaceable cover 20. The replaceable cover 20 may have a plurality of apertures 24-27 of varied dimensions for organizing equipment, such as grips, pliers, knives, etc., at least partially staged within the storage compartment 10. Each tool may fit within one or more of the plurality of apertures 24-27 in a manner that securely stages the tool and minimizes the likelihood that tools will become inadvertently dislodged from the console 1. Having a variety of shapes and sizes for the plurality of apertures 24-27, the user can become accustomed to where within the cover 20 each particular piece of equipment is staged, further simplifying the retrieval process while engaged with a fish.

The exterior dimensions of the cover 20 may be dictated in part by the shape of the bottom wall 4, the circumference of the at least one side wall 7, and the shape of the storage compartment 10. The exterior dimensions of the cover 20 are therefore not particularly limited. The material of the cover 20 should be relatively strong, stiff and light weight. The material of the cover 20 is not particularly limited, but may include metals such as aluminum, as well as polymers.

As best understood from FIG. 5, the cover 20 may be fixed to a top end of the at least one side wall 7 by a thumb screw 30 or other similar fastener. In the illustrated embodiment, a single thumb screw 30 placed near a stern end of the cover 20 may be sufficient to hold the cover 20 in place. In some embodiments, tabs 33 are formed or attached to an upper end of one or more of the at least one side walls 7. The tabs 33 may hold the cover 20 in place against the at least one side wall 7 without fastening the cover 20 to the at least one side wall 7 at the locations corresponding to the tabs 33.

In some embodiments, an upper end of the at least one side wall 7 can include a recess 36 to allow the cover 20 to be flush mounted with at least a portion of the console 1.

The plurality of apertures 24-27 in the cover 20 may be through apertures allowing the staged items to reach the bottom wall 4. In some embodiments, some or all of the apertures 24-27 may be blind apertures to prevent water from reaching the bottom wall 4 though the aperture itself. The plurality of apertures 24-27 may include a round aperture 24 sized to accept a water bottle therethrough. The cover 20 may also include an elongated aperture 25 sized to accept pliers or other tools, an oval aperture 26, or a small circular aperture 27. FIG. 6 shows the console 1 in-use with suggested items staged using the cover 20.

As seen in FIG. 7, the cover 20 may be fitted with additional accessories, such as a rod holder 130. The rod holder 130 and fitting 135 may be mounted to the cover 20 using the apertures 24-27 pre-formed therein, or the cover 20 may be modified for mounting of the accessories. The cover 20 and console 1 provide an advantageous mounting location for accessories because of the central location and the substantially flat surface 22 provide by the cover 20. The storage compartment 10 under the cover 20 also provides clearance for any mountings. The removability of the cover 20 also improves the ease of attaching mounted accessories to the cover 20. The cover 20 allows for convenient mounting of accessories without having to drill through the shell 103 of the kayak 100.

Another possible advantage of the console 1 with a replaceable cover 20 is that the user may be able to select from a variety of covers 20 each with a different number, size, or orientation of apertures 24-27 depending upon the tools the user may wish to stage within the console 1. FIG. 8A shows cover 20. FIG. 8B provides one example of an alternative cover 1020. FIG. 8C shows an example of yet another alternative cover 1120.

The kayak 100 may be described as part of a kit that provides customizable storage and staging options for the kayak 100. In some embodiments, the kit may provide customizable storage and staging options without including the kayak 100 itself as part of the kit. In addition to the kayak 100, which may include much of the console 1, including the bottom wall 4 and the at least one side wall 7, the kit may have at least two replaceable covers 20, 1020 that are interchangeable atop the console 1. The cover 20 may be described as having a first arrangement of apertures 24-27. The alternative covers 1020 and 1120 shown in FIGS. 8B and 8C may be described as having a second arrangement of apertures, the second arrangement being different than the first. The cover 20, 1020, 1120 presently forming the top of the storage compartment 10 may be referred to as the in-use cover.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A kayak comprising:
a shell having a hull and a cockpit;
a console located within the cockpit of the kayak; the console having a bottom wall separate from the hull, and at least one side wall extending upwardly from a periphery of the bottom wall to at least partially define a storage compartment; and
a replaceable cover on the console, the replaceable cover having a plurality of apertures of varied dimensions for organizing equipment at least partially staged within the storage compartment,
wherein the console is integrally molded with the shell.

2. The kayak of claim 1, wherein the console is approximately centrally located within the kayak along a bow-stern direction.

3. The kayak of claim 1, wherein the cover is fixed to the console with a single fastener.

4. The kayak of claim 3, wherein the single fastener is a thumb screw.

5. The kayak of claim 3, wherein the cover is held against an upper end of the at least one side wall with one or more tabs.

6. A kayak comprising:
a shell having a hull and a cockpit;
a console located within the cockpit of the kayak, the console having:
a bottom, and
at least one side wall extending upwardly from a periphery of the bottom to at least partially define a storage compartment; and
a replaceable cover on the console, the replaceable cover having a plurality of apertures of varied dimensions for organizing equipment at least partially staged within the storage compartment, wherein an upper end of the at least one side wall includes a recess to allow the cover to be flush mounted with at least a portion of the console.

7. The kayak of claim 1, wherein at least one of the plurality of apertures is a through aperture allowing the staged equipment to reach the bottom wall.

8. The kayak of claim 1, wherein the plurality of apertures includes a round aperture sized to accept a water bottle therethrough and an elongated aperture sized to accept pliers therethrough.

9. The kayak of claim 1, wherein the bottom wall does not include a scupper hole leading through the hull.

10. A kit comprising:
a kayak having a shell including a hull and a cockpit;
a console approximately centrally located within the cockpit along a widthwise direction of the kayak; the console having a bottom wall separate from the hull, and at least one side wall extending upwardly from a periphery of the bottom wall to at least partially define a storage compartment; and
at least two replaceable covers having the same footprint for alternative placement upon the console, the replaceable covers having a plurality of apertures for organizing equipment at least partially staged within the storage compartment, a first replaceable cover having a first arrangement of the plurality of apertures and a second replaceable cover having a second arrangement of the plurality of apertures, the second arrangement being different from the first.

11. The kit of claim 10, wherein the console is integrally molded with the shell.

12. The kit of claim 11, wherein the console is approximately centrally located within the kayak along a bow-stern direction.

13. The kit of claim 10, wherein the at least two covers are interchangeably fixed to the console with a single fastener.

14. The kit of claim 13, wherein the single fastener is a thumb screw.

15. The kit of claim 13, wherein an in-use cover of the at least two replaceable covers is held against an upper end of the at least one side wall with one or more tabs.

16. The kit of claim 10, wherein an upper end of the at least one side wall includes a recess to allow an in-use cover of the at least two replaceable covers to be flush mounted with at least a portion of the console.

17. The kit of claim 10, wherein at least one of the plurality of apertures is a through aperture allowing the staged equipment to reach the bottom wall.

18. The kit of claim 10, wherein the bottom wall does not include a scupper hole leading through the hull.

* * * * *